United States Patent [19]

Greenberg et al.

[11] 4,428,189
[45] Jan. 31, 1984

[54] CASE DEFLECTION CONTROL IN AIRCRAFT GAS TURBINE ENGINES

[75] Inventors: Paul B. Greenberg, Manchester; C. Heinz Lenkeit, South Windsor; Willard J. Seibert, Manchester, all of Conn.

[73] Assignee: United Technologies Corporation, Hartford, Conn.

[21] Appl. No.: 136,608

[22] Filed: Apr. 2, 1980

[51] Int. Cl.³ .............................................. F02C 7/20
[52] U.S. Cl. .................................... 60/226.1; 244/54; 60/39.31
[58] Field of Search ......................... 60/39.31, 226 R; 244/54

[56] References Cited

U.S. PATENT DOCUMENTS

| | | | |
|---|---|---|---|
| 3,138,920 | 6/1964 | Reichert | 415/181 |
| 3,675,418 | 7/1972 | Lenkeit et al. | 60/39.31 |
| 3,844,115 | 10/1974 | Freid | 60/39.31 |
| 4,022,018 | 5/1977 | Tuten et al. | 60/39.31 |
| 4,266,741 | 5/1981 | Murphy | 244/54 |

Primary Examiner—Carlton R. Croyle
Attorney, Agent, or Firm—Robert C. Walker

[57] ABSTRACT

A gas turbine engine and structure for mounting the gas turbine engine on an aircraft is disclosed. Techniques for controlling the magnitude of engine case deflection from the axis of the engine are developed. The transfer of a portion of the gust and thrust loads externally of the engine case to a location downstream of the rearward engine mount generates a reverse moment which counteracts deflection in the engine case.

4 Claims, 2 Drawing Figures

CASE DEFLECTION CONTROL IN AIRCRAFT GAS TURBINE ENGINES

DESCRIPTION

1. Technical Field

This invention relates to gas turbine engines and particularly to structures for minimizing engine case deflection under gust and thrust loads.

The concepts were developed specifically for high bypass ratio, ducted fan engines, but have broader applicability to low bypass ratio and turbojet engines as well.

2. Background Art

Modern gas turbine engines in commercial usage today are of the turbofan type. A portion of the working medium gases is directed from the engine inlet through the compression, combustion, and turbine sections of the engine. The remaining portion of the working medium gases is directed through fan stages, around the engine core, and discharged directly to the atmosphere. The diameter of the engine at the fan stages is typically quite large, on the order of eight feet (8 ft.) for high bypass ratio engines of the fifty thousand pound (50,000 lb.) thrust class.

Each engine is supported by aircraft structure, for example, on a pylon extending downwardly beneath the wing. A first mounting means toward the forward end of the engine, but rearwardly of the fan section and a second mounting means toward the aft end of the engine secure the engine to the pylon. A cowl structure having an annular passageway circumscribes the engine and extends downstream to the proximate end of the turbine exhaust case. The downstream end of the cowl structure is conventionally attached to the engine case at the same axial plane at which the engine is attached to the pylon. In some engines only the inner wall of the cowl structure extends downstream past the turbine exhaust case. In such engines the inner wall of the cowl structure is typically attached to the engine case, again at the same axial plane at which the engine is attached to the pylon. The remaining portion of the cowl may overhang the core flowpath downstream of the engine.

The engine case itself comprises the principal backbone structure of the engine. The rotor bearings are housed in compartments positioned inwardly of the engine case at the axis of the engine. Maintaining the engine case concentrically about the engine rotor is of obvious criticality, and a constant objective of gas turbine scientists and engineers. Structures of the past decades, including the annular cowl structure hereinbefore described, are now known to be generally supportive of the engine backbone, and when attached in the manner described, provide significant reinforcing stiffness to the engine case. Increased stiffness, of course tends to decrease case deflection from the axis with a resultant improvement in concentricity.

Increasing fuel costs and demands for improved durability accentuate the need for increased case stiffness and/or other techniques for limiting case deflection from the engine axis.

DISCLOSURE OF INVENTION

According to the present invention the deflective effect of gust and thrust loads on the engine case of a gas turbine engine is reduced by transferring a portion of the resultant loads externally of the engine case to a point on the engine case rearwardly of the rear engine mount.

According to a turbofan embodiment of the invention, the resultant loads are transferred through a cowl structure containing the fan stream to the turbine exhaust case at a point downstream of the rear engine mount.

A primary feature of the present invention is the point on the turbine exhaust case at which the induced bending moment is counteracted. Loads are transferred to a point downstream of the rear engine mount causing the case to pivot about the downstream mount in the direction of the transferred load which is applied.

A principal advantage of the present invention is improved concentricity of the engine case about the engine axis. Increased fuel economy and component durability result. Engine case deflection as a result of gust and thrust loads about the forward mount is counteracted by transferred load to the application point downstream of the rear mount. Sharply reduced case deflection at all points along the axis of the engine is achieved.

The foregoing, and other features and advantages of the present invention, will become more apparent in the light of the following description and accompanying drawing.

BEST MODE FOR CARRYING OUT THE INVENTION

Figure 1:
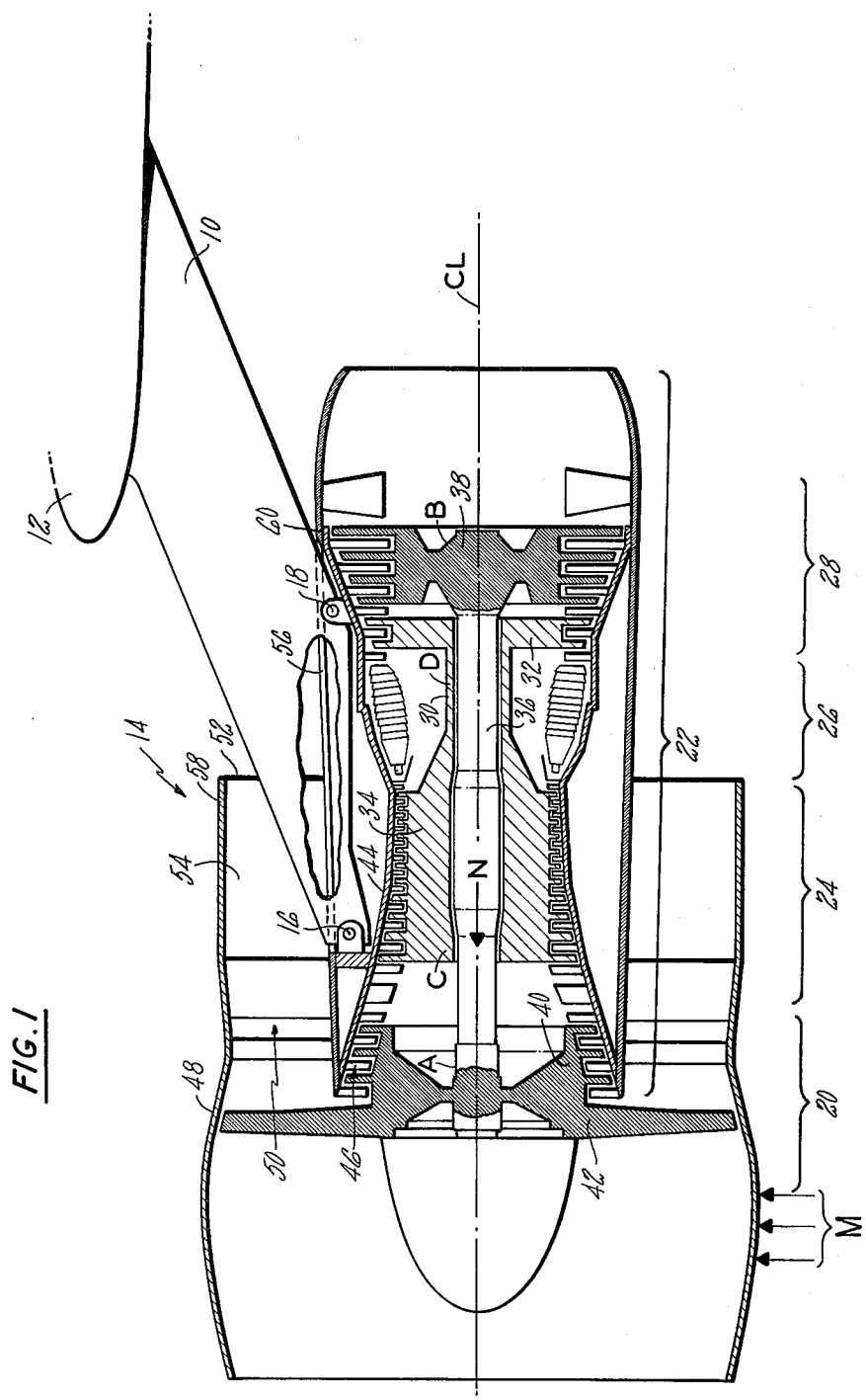
FIG. 1 is a schematic cross section view of a turbofan gas turbine engine mounted beneath the wing of an aircraft.

An engine housed in mounting structure and employing the concepts of the present invention is illustrated in the FIG. 1 schematic cross section view. A mounting pylon 10 extends downwardly from the aircraft wing 12. The engine 14 is attached to the pylon at a forward mounting means 16 and at a rearward mounting means 18. The engine is of the turbofan type and principally comprises a fan section 20 and a core section 22 including a compression section 24, a combustion section 26 and a turbine section 28. The engine is of the two spool type having a high rotor 30 joining a high pressure turbine section 32 to a high pressure compression section 34 and a low rotor 36 joining a low pressure turbine section 38 to a low pressure compressor 40 and a fan stage 42. The low rotor is supported from the engine case at bearing locations A and B. The high rotor is supported from the engine case at bearing locations C and D. An engine case 44 circumscribes a core stream 46 of the engine. A face case 48 circumscribes a fan stream 50 of the engine. A cowl 52 extends downstream of the fan section about the core portion of the engine. The cowl has an annular passageway 54 extending between an inner wall 56 and an outer wall 58 through which the core stream flows.

The engine is illustrated in the approximate attitude of level cruise and ground taxi conditions with the engine centerline or axis CL being substantially horizontal. As the aircraft leaves the runway and takes a climb condition attitude the axis of the engine becomes canted to the direction of approaching airflow. As a result gust loading, on the bottom of the fan section in the direction M, tends to pivot the engine in the clockwise direction as illustrated, about the forward mounting means 16. The condition is particularly severe in engines with large diameter fan sections. Concurrently, thrust loads generated within the engine and acting along the engine axis in the direction N further tend to cause the engine to pivot in the clockwise direction as illustrated, about the forward mounting means. Rotation of the engine about the forward mount is restrained by the rear mounting means 18 with the result that the induced bending moments are dissipated within the engine case structure. Deflections of the case from the original engine axis result.

Figure 2:
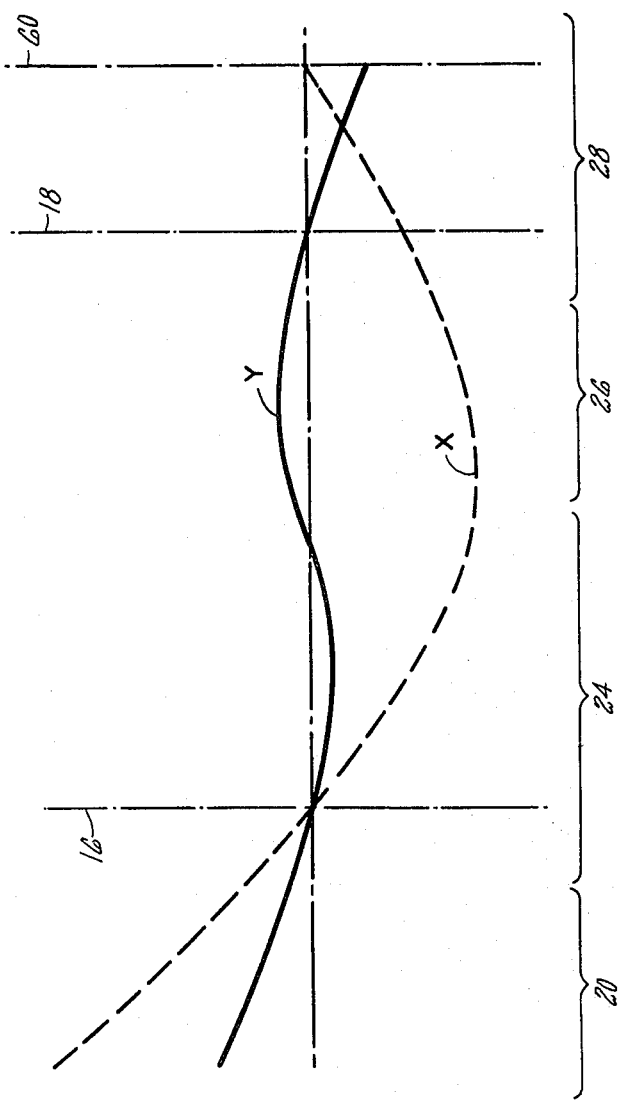
FIG. 2 is a graph showing deflection of the engine case under gust and thrust loads as a function of axial position along the engine centerline.

Deflections in a corresponding engine not incorporating the concepts of the present invention are illustrated by the curve X of the FIG. 2 graph. In the structure represented by this curve, the rearward mounting means of the engine to the pylon and the attachment point of the cowl inner wall are in the same axial plane at the downstream end of the turbine exhaust case. Deflections at the turbine exhaust case may approximate a magnitude of twenty-five thousandths of an inch (0.025 in.) and at the compression section may approximate a magnitude of fifty thousandths of an inch (0.050 in.). By applying the concepts of the present invention, deflections at the turbine exhaust case are reduced by an approximate factor of two (2) and deflections at the compression section are reduced by an approximate factor of four (4).

Note particularly that the inner wall 56 of the cowl 52 of the present structure extends rearwardly, externally of the engine case and is attached to the engine case 44 at a location 60 downstream of the rearward mounting means 18. Reacting to gust and thrust loads in a manner similar to the engine case, the cowl tends to rotate in the clockwise direction as illustrated. Unlike the engine case, however, the cowl is not restrained by the rearward mounting means, at least not until a load has been applied through the cowl to the engine case and thence to the rearward mounting means.

The cowl load applied downwardly at 60 deflects the case downwardly at that point. In at least one installation, it has been found that the magnitude of the reversal deflection is approximately half of the magnitude of the deflection expected without the transferred cowl loading.

The cowl loading at location 60 causes a counter clockwise moment as illustrated, about the rearward mounting means which is dissipated within the deflecting case. The directions of deflection induced about the forward mount and about the rearward mount are opposite in direction and, in combination, reduce the actual observed deflections of the engine axis. Deflections in an engine incorporating the concepts of the present invention is illustrated by the curve Y of the FIG. 2 graph.

Although the concepts are illustrated in a turbofan embodiment in which gust and thrust loads are transferred by the cowl 52 to the location 60, the load may be transferred by other beam type structures or rods. It is important only that the externally transferred load be applied to the engine case rearwardly of the rearward mounts such that the described deflection countering moment can be generated.

Although the invention has been shown and described with respect to detailed embodiments thereof, it should be understood by those skilled in the art that various changes and omissions in form and detail may be made therein without departing from the spirit and the scope of the invention.

We claim:

1. An aircraft gas turbine engine of the type having an engine case and including forward mounting means and rearward mounting means for attaching the engine case to the aircraft, wherein the improvement comprises:

means external to the engine case and pivotable about the forward mounting means for transferring loads applied about the forward mounting means to a location on the engine case downstream of the second mounting means.

2. The invention according to claim 1 wherein said means for transferring said loads to the location downstream of the second mounting means is attached to the engine case upstream of the forward mounting means and to the engine case downstream of the rearward mounting means.

3. The invention according to claim 2 wherein said means for transferring said loads is pivotable about the forward mounting means to cause downward deflection of the engine case at the downstream point of attachment of the load transferring means to the engine case.

4. An aircraft gas turbine engine of the turbofan type having a fan section and a core section wherein the core section is circumscribed by an engine case having at the forward end thereof a first mounting means and at the rearward end thereof a second mounting means for attaching the engine case to the aircraft, and having a cowl structure attached at one end to the engine case downstream from the fan section, and pivotable about the forward mounting means wherein the cowl is attached at the other end thereof to the engine case at a location downstream of the second mounting means so as to be capable of resisting case deflection downstream of the second mounting means in response to moments generated by thrust loads about the first mounting means.

* * * * *